(12) United States Patent
Hiramatsu

(10) Patent No.: US 9,165,438 B2
(45) Date of Patent: Oct. 20, 2015

(54) DISPLAY PROCESSING SYSTEM, DISPLAY PROCESSING METHOD, AND PROGRAM

(75) Inventor: Takeshi Hiramatsu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 111 days.

(21) Appl. No.: 13/821,671

(22) PCT Filed: Aug. 30, 2011

(86) PCT No.: PCT/JP2011/004839
§ 371 (c)(1),
(2), (4) Date: Mar. 8, 2013

(87) PCT Pub. No.: WO2012/032737
PCT Pub. Date: Mar. 15, 2012

(65) Prior Publication Data
US 2013/0169447 A1    Jul. 4, 2013

(30) Foreign Application Priority Data
Sep. 9, 2010   (JP) .................................. 2010-202199

(51) Int. Cl.
| G08B 3/00 | (2006.01) |
| G08B 5/22 | (2006.01) |
| G06F 11/32 | (2006.01) |
| G06F 1/20 | (2006.01) |
| G06F 1/28 | (2006.01) |

(52) U.S. Cl.
CPC *G08B 5/22* (2013.01); *G06F 1/206* (2013.01); *G06F 1/28* (2013.01); *G06F 11/32* (2013.01)

(58) Field of Classification Search
CPC .............. G05B 23/0267–23/0272; G08B 5/22; G06F 11/32; G06F 1/28; G06F 1/206
USPC ............... 340/691.6, 511, 521; 702/182, 183; 715/700
See application file for complete search history.

(56) References Cited

U.S. PATENT DOCUMENTS

| 6,587,108 B1 * | 7/2003 | Guerlain et al. ............... 715/965 |
| 2008/0052040 A1 * | 2/2008 | Renner .......................... 702/182 |

FOREIGN PATENT DOCUMENTS

| JP | 05-166086 A | 7/1993 |
| JP | 2005-122586 A | 5/2005 |
| JP | 2009-199122 A | 9/2009 |
| JP | 2009-252056 A | 10/2009 |

* cited by examiner

*Primary Examiner* — Thomas Mullen
(74) *Attorney, Agent, or Firm* — Sughrue Mion, PLLC

(57) ABSTRACT

A display processing system including: a state display unit which displays, for a plurality of parameters each having an upper limit value, a state value of each parameter for a predetermined period of time with respect to the upper limit value; a determination unit which determines, for each of the parameters, whether the state value is close to the upper limit value or not; a warning display unit which displays a warning to a user with regard to a parameter of which the state value is determined by the determination unit to be close to the upper limit value; and a countermeasure display unit which displays, for each of the parameters, a countermeasure for improving the state when the state value is close to the upper limit value.

11 Claims, 17 Drawing Sheets

1 DISPLAY PROCESSING SYSTEM

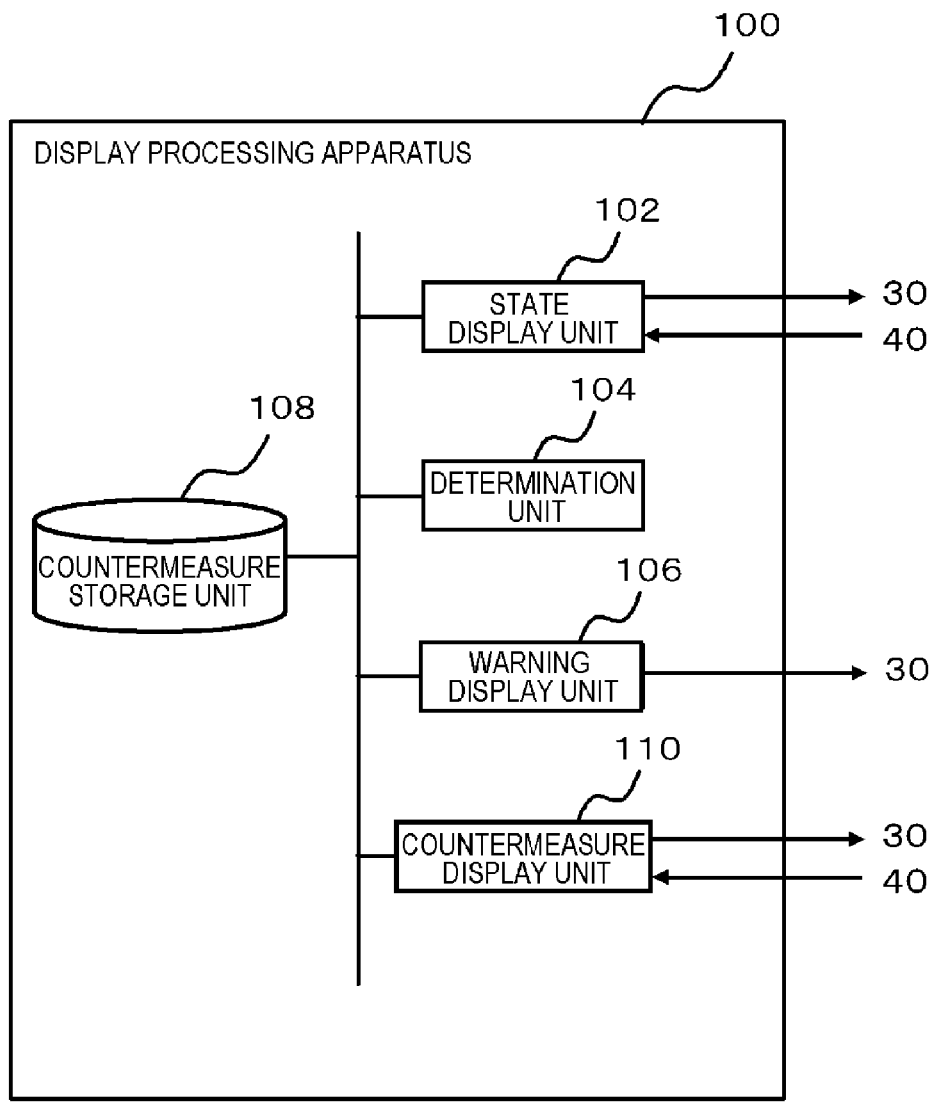

FIG. 3

COUNTERMEASURE TABLE 120

| PARAMETER | COUNTERMEASURE | | |
|---|---|---|---|
| A (POWER SUPPLY ELECTRIC POWER) | COUNTERMEASURE A1 | COUNTERMEASURE A2 | COUNTERMEASURE A3 |
| B (RACK SPACE) | COUNTERMEASURE B1 | COUNTERMEASURE B2 | COUNTERMEASURE B3 |
| C (AIR-CONDITIONING PERFORMANCE) | COUNTERMEASURE C1 | COUNTERMEASURE C2 | COUNTERMEASURE C3 |
| D (UPS POWER SUPPLY CAPACITY) | COUNTERMEASURE D1 | COUNTERMEASURE D2 | COUNTERMEASURE D3 |

FIG. 9

EFFECT TABLE 210

| COUNTERMEASURE | EFFECT | | |
|---|---|---|---|
| | PARAMETER A | PARAMETER B | PARAMETER C |
| P1 (ADDITIONALLY INSTALLUPS) | +2 | −3 | 0 |
| P2 (POWER-SAVING MACHINES ARE INTRODUCED) | +1 | +1 | +1 |
| P3 (INTRODUCE SPOT COOLING DEVICE) | +1 | 0 | 0 |
| | | | |

DISPLAY PROCESSING SYSTEM, DISPLAY PROCESSING METHOD, AND PROGRAM

CROSS REFERENCE TO RELATED APPLICATIONS

This application is a National Stage of International Application No. PCT/JP2011/004839, filed on Aug. 30, 2011, which claims priority from Japanese Patent Application No. 2010-202199, filed Sep. 9, 2010, the contents of all of which are incorporated herein by reference in their entirety.

TECHNICAL FIELD

The present invention relates to a display processing system, a display processing method, and a program, and more particularly, to a display processing system, a display processing method, and a program for displaying management information about a system.

BACKGROUND ART

In recent years, as computers are incorporated into cloud computing configurations, and at data centers or the like, the enlarged scales and complexity of the information technology (IT) device and services are accelerated. As a result, how to efficiently manage operation of a system and how to ensure the reliability are an important issue.

Concerning such a device for inspecting a system wherein, patent document 1 describes an example of configuration for visualizing an evaluation result of aging of the system in an integrated manner. A system aging inspection device of patent document 1 provides four evaluation items for eight evaluation bases of aging of the system, evaluates each item in three stages, calculates the evaluation result, and generates a radar chart using each comparison basis from the calculation result.

Patent document 2 describes an example of an operation management device of an information processing system. The operation management device of the information processing system of patent document 2 visualizes real space information where device groups and facilities are installed, using, for example, a layout diagram, based on information about air-conditioning performance and power supply capacity of devices in a data center.

Further, patent document 3 describes an example of a computer environment optimization system. The computer environment optimization system of patent document 3 determines occurrence of heat accumulation based on an abnormal temperature of each server in a large-scale computer system, analyzes a rack having a server determined to be abnormal, and makes a list of servers which are the target of control of temperature increase preventing processing.

RELATED DOCUMENT

Patent Document

[Patent document 1] Japanese Unexamined Patent Application Publication No. 2005-122586
[Patent document 2] Japanese Unexamined Patent Application Publication No. 2009-252056
[Patent document 3] Japanese Unexamined Patent Application Publication No. 2009-199122

SUMMARY OF THE INVENTION

In the technique described in the above patent documents, it is difficult to understand problematical points of the system in an integrated manner based on parameters indicating the operation management situation of the system, and there is a problematical point in that it is difficult to easily know appropriate measures for solving the problematical point in an integrated manner.

This is because, patent documents 2 and 3 describe finding a situation about a particular parameter of parameters indicating operation management situations of the system, but with the technique described in these documents, it is impossible to find a plurality of parameters indicating the operation management situations of the system in an integrated manner. The device described in patent document 1 calculates and presents the result obtained by evaluating the evaluation bases, but it is impossible to find, for example, comparison result between the state value of a parameter indicating the operation management situation of the system and the upper limit value of the parameter for finding the problem.

In addition, the parameters indicating the operation management situations of the system are correlated with each other, and the measures for solving these problematical points are also related to each other in a complicated manner. However, none of the techniques described in the above documents presents optimum measures in view of the effect to the other parameters.

The present invention is made in view of the above circumstances, and it is an object of the present invention to provide a display processing system, a display processing method, and a program for improving the efficiency and the reliability of a system management.

According to the present invention, a display processing system includes: a state display unit which displays, for a plurality of parameters each having an upper limit value, a state value of each parameter for a predetermined period of time with respect to the upper limit value; a determination unit which determines, for each of the parameters, whether the state value is close to the upper limit value or not; a warning display unit which displays a warning to a user with regard to the parameter of which said state value is determined by the determination unit to be close to the upper limit value; and a countermeasure display unit which displays, for each of the parameters, a countermeasure for improving the state when the state value is close to the upper limit value.

According to the present invention, a display processing method to be executed by a processing apparatus having a display unit includes: displaying, for a plurality of parameters each having an upper limit value, a state value of each parameter for a predetermined period of time with respect to the upper limit value, on the display unit; determining, for each of the parameters, whether the state value is close to the upper limit value or not; displaying, on the display unit, a warning to a user with regard to the parameter of which the state value is determined to be close to the upper limit value; and displaying, for each of the parameters, a countermeasure for improving the state on the display unit when the state value is close to the upper limit value.

According to the present invention, a program causes a computer having a display unit to perform: a procedure for displaying, for a plurality of parameters each having an upper limit value, a state value of each parameter for a predetermined period of time with respect to the upper limit value, on the display unit; a procedure for determining, for each of the parameters, whether the state value is close to the upper limit value or not; a procedure for displaying, on the display unit, a warning to a user with regard to the parameter of which the state value is determined to be close to the upper limit value; and a procedure for displaying, for each of the parameters, a countermeasure for improving the state on the display unit when the state value is close to the upper limit value.

It should be noted that, any combination of the above constituent elements and expression of the present invention converted into a method, an apparatus, a system, a recording medium, a computer program, or the like are also effective as an aspect of the present invention.

Various kinds of constituent elements of the present invention may not necessarily exist independently from each other, and may be in the following manner: a plurality of constituent elements may be formed as one member, one constituent element may be formed with a plurality of members, a certain constituent element may be a part of another constituent element, or a part of a certain constituent element may overlap a part of another constituent element.

Further, the method and the computer program of the present invention are described such that a plurality of procedures are described in order, but the order of the description is not intended to limit the order of execution of a plurality of procedures. Accordingly, when the method and the computer program of the present invention are carried out, the order of a plurality of procedures may be changed within the scope not causing any problem in terms of the contents.

Further, the order of a plurality of procedures of the method and the computer program of the present invention is not limited to execution with timing different from each other. For this reason, for example, another procedure may occur during execution of a certain procedure, and execution timing of a certain procedure may partially or entirely overlap execution timing of another procedure.

According to the present invention, it is possible to provide a display processing system, a display processing method, and a program for improving the efficiency and reliability of system management.

BRIEF DESCRIPTION OF THE DRAWINGS

The aforementioned objects and other objects, features, and advantages will be more apparent from the following preferred exemplary embodiments and the following drawings attached thereto.

FIG. 2 is a functional block diagram illustrating a configuration of a display processing apparatus of the display processing system according to the exemplary embodiment of the present invention.

FIG. 3 is a figure illustrating an example of a structure of a countermeasure table stored in a countermeasure storage unit of the display processing system according to the exemplary embodiment of the present invention.

FIG. 9 is a figure illustrating an example of a structure of an effect table stored in an effect storage unit of the display processing system according to the exemplary embodiment of the present invention.

DESCRIPTION OF EXEMPLARY EMBODIMENTS

Figure 1:
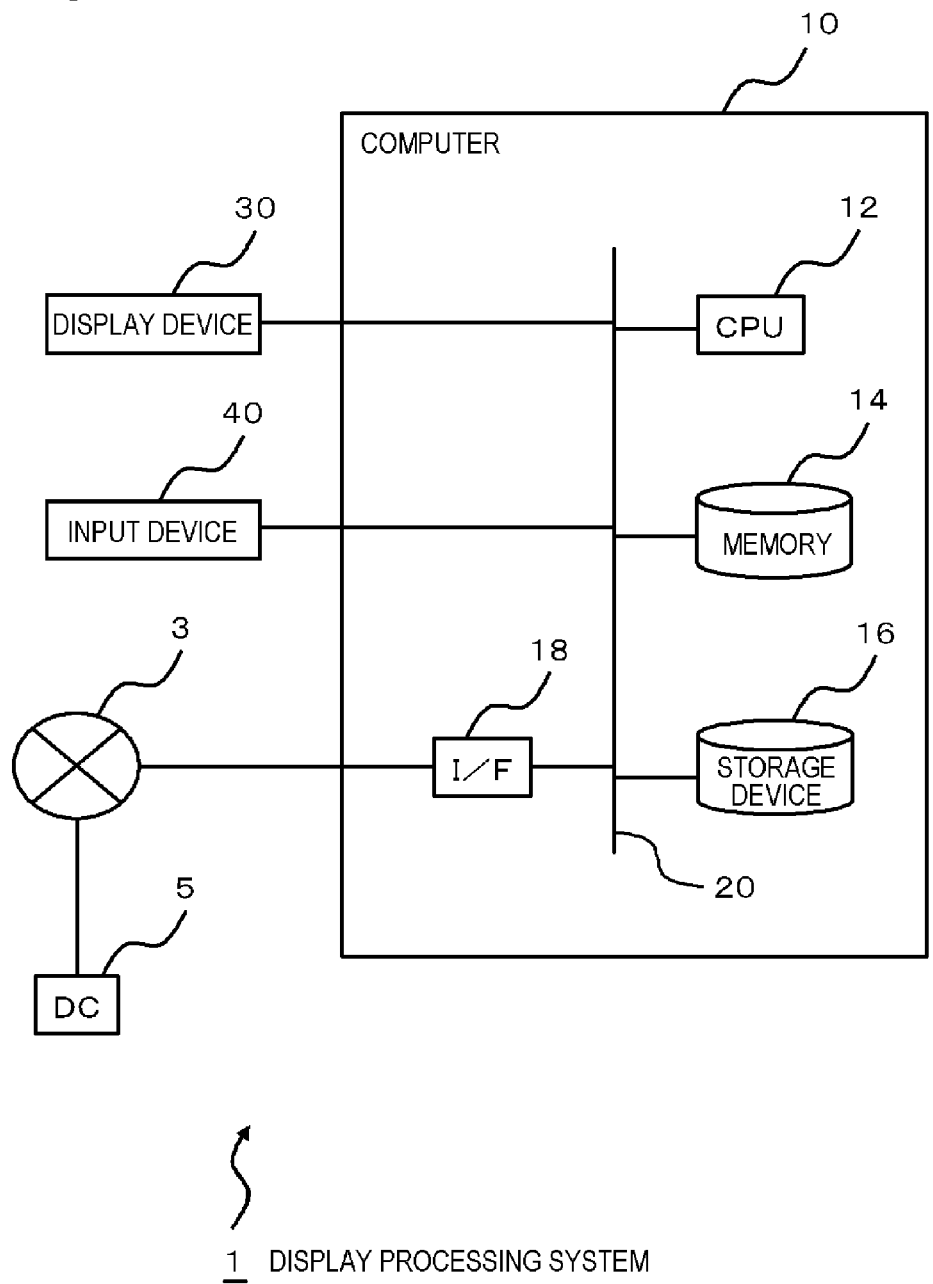
FIG. 1 is a block diagram illustrating a configuration of a display processing system according to an exemplary embodiment of the present invention.

Exemplary embodiments of the present invention will be hereinafter explained with reference to drawings. In all the drawings, the similar reference numerals are attached to the similar constituent elements, and the description thereof will not be repeated as necessary.

First Exemplary Embodiment

FIG. 1 is a block diagram illustrating a configuration of a display processing system 1 according to an exemplary embodiment of the present invention.

For example, the display processing system 1 according to the exemplary embodiment of the present invention presents, to users, information indicating operation management state of a system such as capacity and resource usage rate of respective facilities of a data center (DC) 5 connected through a network 3. In this exemplary embodiment, the user is, for example, an administrator who manages the system of the data center 5, or the like. In the data center 5, for example, many computers are accommodated in a plurality of racks having accommodating units in multiple columns and multiple rows arranged on the floor. The data center 5 may further include a plurality of floors or a plurality of buildings.

The display processing system 1 includes, for example, a computer 10 including a central processing unit (CPU) 12, a memory 14, a storage device 16 such as a hard disk, and a communication device (interface (I/F) 18 in the drawing). The CPU 12 is connected to each element of the computer 10 through a bus 20, and the CPU 12 as well as each element controls the overall computer 10. The computer 10 of the display processing system 1 can be achieved with a server computer, a personal computer, or a device corresponding thereto which is connected to an input device 40 such as a keyboard or a mouse, a display device 30 such as a display, and an output device such as a printer (not shown). Then, the CPU 12 loads a program stored in the storage device 16 to the memory 14 and executes the program, thus achieving each function of each unit explained below.

In each drawing, a configuration of elements not related to essential features of the present invention are omitted, and are not shown in the drawings.

FIG. 2 is a functional block diagram illustrating a configuration of a display processing apparatus 100 achieved by a computer 10 of the display processing system 1 according to the exemplary embodiment of the present invention.

As illustrated in FIG. 2, the display processing system 1 according to the present exemplary embodiment includes a state display unit 102 that displays a state value of each parameter for a predetermined period of time with respect to the upper limit value for a plurality of parameters each having an upper limit value, a determination unit 104 that determines, for each of the parameters, whether the state value is close to the upper limit value or not, a warning display unit 106 that displays a warning to a user with regard to the parameter which the determination unit 104 determines that the state value thereof is close to the upper limit value, and a countermeasure display unit 110 that displays, for each of the parameters, a countermeasure for improving the state when the state value is close to the upper limit value.

Each constituent element of the display processing apparatus 100 is achieved with any combination of software and hardware such as the CPU 12, the memory 14, program elements loaded to the memory 14, the storage device 16 such as a hard disk storing the program, and a network connection interface 18, which are provided in the computer 10 (FIG. 1) explained above. Further, a person skilled in the art could understand that various modifications exist for the achieving method and the apparatus. Each drawing explained below is illustrated as blocks in units of functions, not the configuration in units of hardware.

A computer program according to the present exemplary embodiment is described to cause the computer 10 (FIG. 1) for achieving the display processing apparatus 100 to perform: a procedure for displaying a state value of each parameter for a predetermined period of time with respect to the upper limit value on the display device 30 (FIG. 1) for a plurality of parameters each having the upper limit value, a procedure for determining, for each parameter, whether the state value is close to the upper limit value or not, a procedure for displaying a warning to a user on the display device 30 (FIG. 1) with regard to the parameter which is determined that the state value is close to the upper limit value, and a procedure for displaying, for each parameter, a countermeasure for improving the state on the display device 30 (FIG. 1) when the state value is close to the upper limit value.

The computer program according to the present exemplary embodiment may be recorded in a computer-readable recording medium. The recording medium is not particularly limited, and various forms of recording media may be considered. The program may loaded from the recording medium to the memory of the computer, or may be downloaded through a network to the computer, and loaded to the memory.

More specifically, the display processing apparatus 100 includes a state display unit 102, a determination unit 104, a warning display unit 106, a countermeasure storage unit 108, and a countermeasure display unit 110.

The state display unit 102 displays, on the display device 30 of the computer 10 (FIG. 1), a screen 130 (FIG. 4) indicating a state value of each parameter for a predetermined period of time with respect to the upper limit value, for a plurality of parameters each having the upper limit value.

In the present exemplary embodiment, the parameter is, for example, information about the operation management situation of IT devices and services of the data center 5, and may include a rack space, power supply electric power (e.g., state of utilization, availability, capacity etc., which, for example, may be measured in kW), air-conditioning performance, or a power supply capacity (kW or kVA) of an uninterruptible power supply system (UPS) related to management of facilities of the data center 5, and a CPU load rate, a memory capacity or a hard disk memory capacity related to resource (machine) management of a computer of the data center 5, or the like.

In the present exemplary embodiment, the state value of each parameter may include, for example, a predetermined statistical value and an average value calculated from a measurement value of each parameter for a specified period of time. The predetermined period of time may be a specified period of time specified by a user in advance and by changing the period of time as necessary, such as one minute, one hour, one day, one week, one month, three months, six months, or any given specified period. The state value of each parameter may be obtained by various methods having various timings. For example, the state value of each parameter may be included in information stored in the memory 14 obtained in advance by the display processing apparatus 100, and may be included in information received from the network or other recording medium with a regular interval or as necessary. Calculation processing of the average value and the statistical value may be done by the display processing apparatus 100, and may be obtained by another computer.

The parameter which is target of display may be selected in advance or selected as necessary with a setting screen (not shown) by a user. Further, the upper limit value for the predetermined period of time of each parameter is obtained by receiving the value set with a setting screen (not shown) by a user in advance as the setting value, and each may be stored to the memory 14 of the computer 10.

Parameters may preferably intercorrelate with each other, and may be preferably displayed so that the state values thereof can be compared on the screen.

Figure 4:
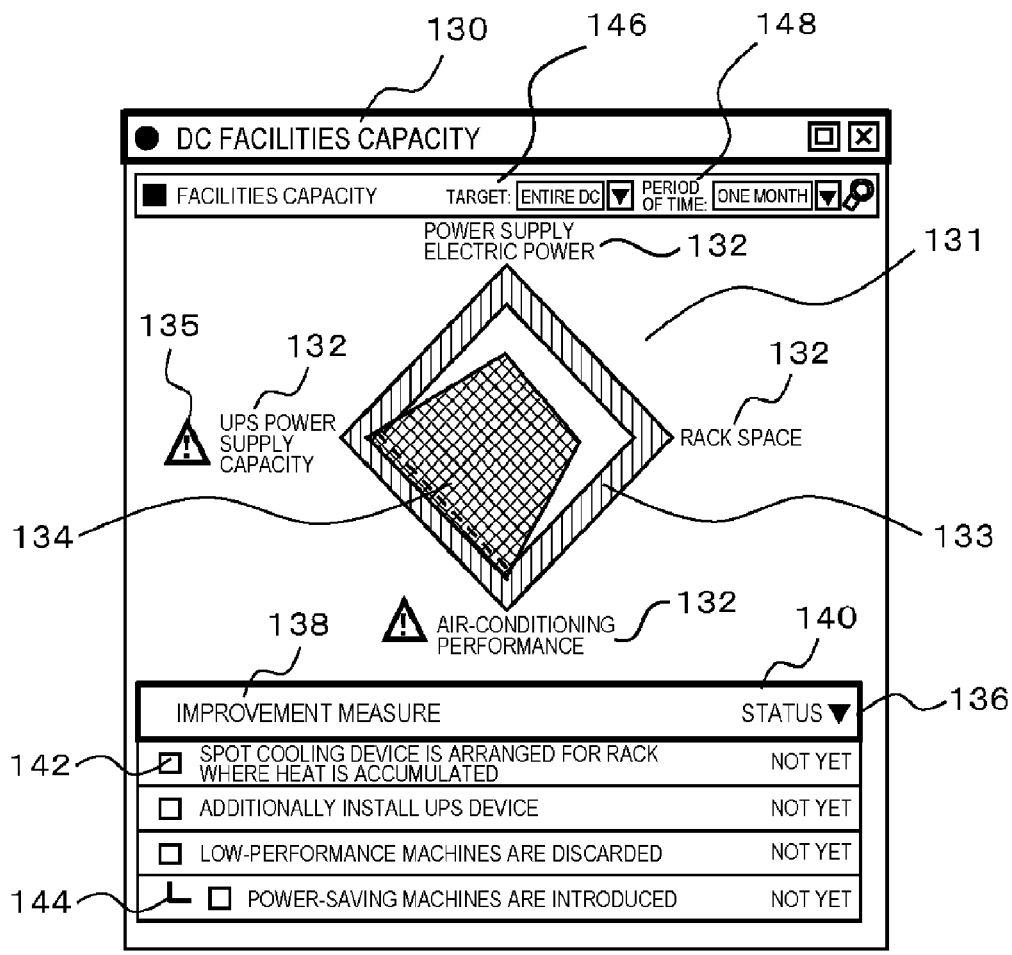
FIG. 4 is a figure illustrating an example of a display screen of the display processing system according to the exemplary embodiment of the present invention.

As illustrated on the screen 130 of FIG. 4, the state display unit 102 may display, for example, correlations by showing the state values of the parameters on a radar chart 131 where the parameter is adopted as each axis (not shown). The screen 130 of FIG. 4 includes the radar chart 131 and a countermeasure list 136 explained later.

In the display processing apparatus 100 according to the present exemplary embodiment, the state value of the parameter displayed on the screen 130 of FIG. 4 by the state display unit 102 may be displayed with a ratio, a percentage, or the like with respect to the upper limit value. For example, like the radar chart 131 of FIG. 4, the upper limit value of the parameter of each axis of an upper limit value display portion 133 is 100%, and therefore, the upper limit value display portion 133 is displayed at a position of the same distance from the center of each axis of the radar chart 131. As illustrated in FIG. 4, the upper limit value display portion 133 may be displayed in a belt-like region having a width α (not shown). When the state value enters into the region of the upper limit value display portion 133, the determination unit 104 determines that countermeasure is required for the parameter as explained later.

In this case, α is a value indicating the degree of closeness of the state value of the parameter to the upper limit value makes it necessary to determine whether it is necessary to take countermeasures for the parameter. The value α may be set for each parameter. It may be set with a percentage with respect to the upper limit value (100%) or may be set with a numerical value in units of state values. These settings may be changed by the user on the setting screen (not shown) or the screen 130.

A state display portion 134 may convert the state value of each parameter into the percentage with respect to the upper limit value (100%), and display it on each axis of the radar chart 131. In the radar chart 131 of FIG. 4, four parameters, that is, the power supply electric power, the rack space, the air-conditioning performance, and the UPS power supply capacity are allocated to four axes, and the name is displayed in each label 132. The upper limit value of the parameter of each axis is displayed as illustrated in the upper limit value display portion 133, and the state value of each parameter is displayed as illustrated in the state display portion 134.

When the states of a plurality of parameters having the same unit or index are displayed (for example, the power supply electric power capacity and the UPS power supply capacity, or the memory capacity and the HDD capacity), the actual values may be displayed with the same scale so as to allow comparison on the screen 130. More specifically, when the upper limit value is different for each parameter, the distance from the center of each axis indicating the upper limit value of the upper limit value display portion 133 may be different.

It should be noted that the mode of display of the state value of the parameter is not limited to the radar chart 131 of FIG. 4, and various modes such as a bar graph, a time-series line graph, or the like may be considered. For example, numerical values of the state values and the upper limit values may be displayed in a list table.

Figure 5:
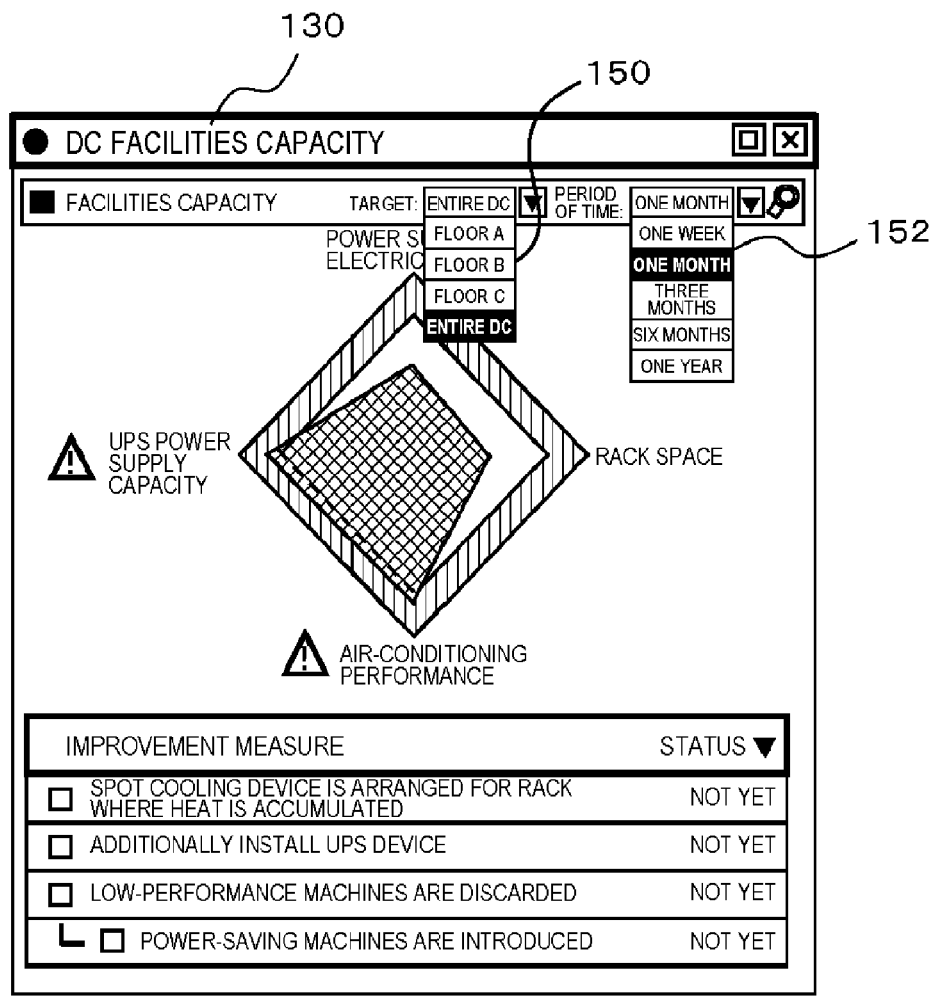
FIG. 5 is a figure illustrating an example of a display screen of the display processing system according to the exemplary embodiment of the present invention.

As illustrated in FIG. 5, the user may manipulate an input device 40 to specify a period of time from a period selection list 152. The state display unit 102 receives this specified period of time, and displays the average value, the predetermined statistical value, or the like of the state value of each parameter in the specified period of time. For example, these values may be displayed upon, by the user, specifying in advance or changing as necessary a specified period of time such as one minute, one hour, one day, one week, one month, three months, six months, or any given specified period. The display of the state values by the state display unit 102 may be updated at all times or may be updated upon a command. In FIG. 4, the specified period of time (one month) is displayed in a selected period display section 148, and on the screen 130, the average value of the state value in a month including the current point of time or in a month of previously calculated values is displayed.

Figure 7:
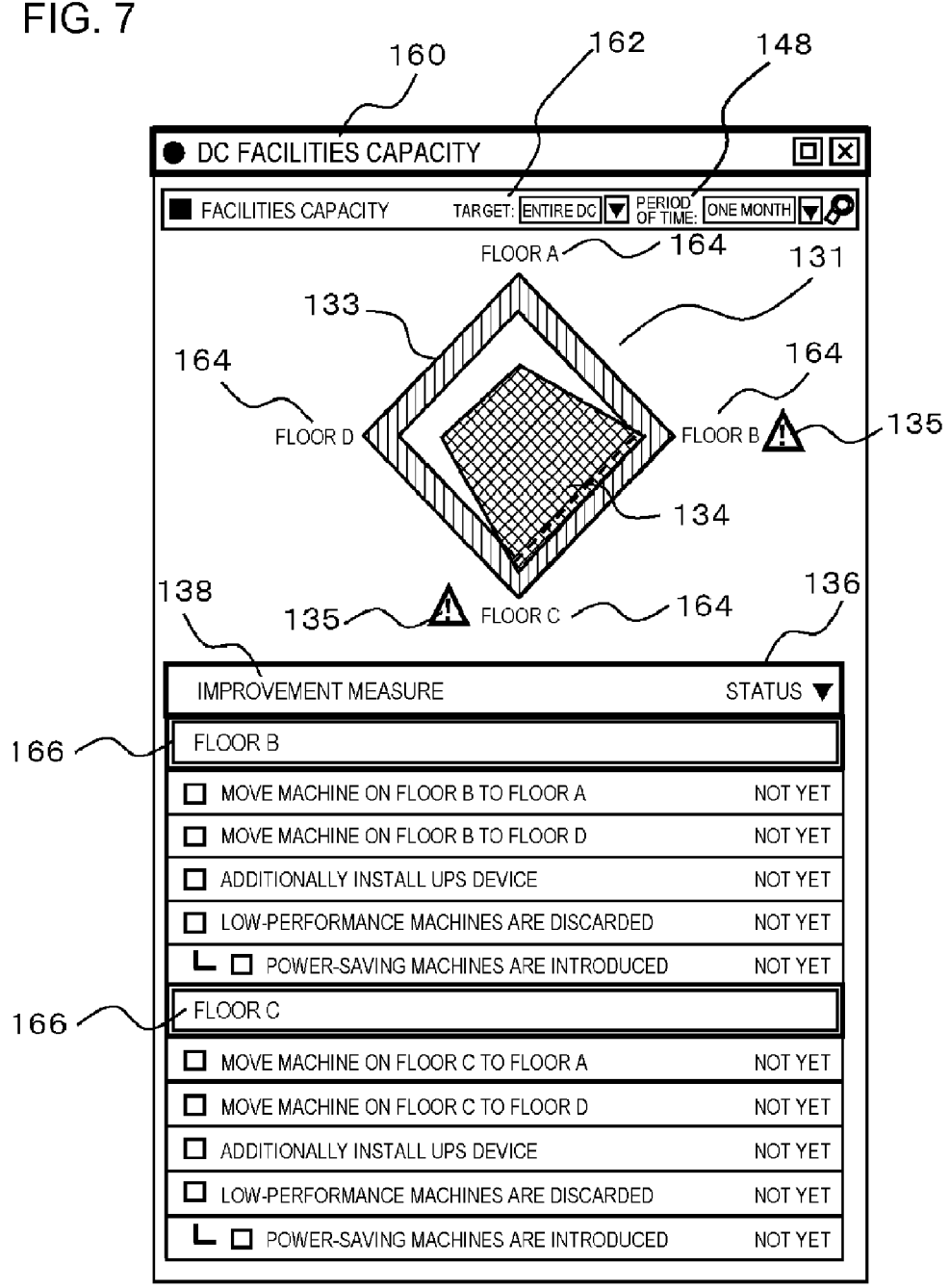
FIG. 7 is a figure illustrating an example of a display screen of the display processing system according to the exemplary embodiment of the present invention.

As illustrated in FIG. 5, the user may manipulate the input device 40 to specify the target where the state values are displayed from a target selection list 150 by selecting the entire data center 5 or selecting a part of the data center 5. The user may select, as the target of display, for example, all of the data center, floors, rooms, other predetermined classifications, all of the company, subsidiaries, divisions, facilities, the entire country, prefectures, and municipalities. As illustrated in FIG. 7 explained later, the state display unit 102 may display the state values so that, concerning one parameter, a plurality of targets (facilities, floors or the like) may be compared. In the screen 130 of FIG. 4, the specified target is displayed in a selection target display section 146, and the specified targets, that is, the average value of the state values of the entire data center 5 in this case, are displayed in the radar chart 131.

Back to FIG. 2, the determination unit 104 determines, for each parameter, whether the state value is close to the upper limit value or not. When the state value is equal to or more than (the upper limit value−α) for each parameter, the state value of the parameter is determined to be close to the upper limit value, and when it is less than (the upper limit value−α), the state value of the parameter is determined to be normal. In the present exemplary embodiment, "the state value is close to the upper limit value" of the parameter means a level that needs to be notified to the user before failure such as system down occurs when the state value of the parameter becomes more than the upper limit value. "The state value is close to the upper limit value" of the parameter may be a value which is lower than the upper limit value and at which no failure occurs. When the user receives the notification that the state value of the parameter is close to the upper limit value, the user can take measures to return the state value of the parameter back to the normal state before failure occurs.

When the determination unit 104 determines that it is necessary to take measures concerning the parameter of which state value is determined to be close to the upper limit value, the determination unit 104 notifies the warning display unit 106 and countermeasure display unit 110 to that effect. When the state value of the parameter is determined to be close to the upper limit value, it may be determined that it is necessary to take measures without any condition, or the determination may be made in view of predetermined condition that is set in advance. The number of upper limit value of the state value of each parameter is not limited to one. A plurality of levels may be provided in a stepwise manner.

Moreover, when the determination unit 104 determines whether it is close to the upper limit value or not, a dead band (non-sensitive band without reaction) concerning (the upper limit value−α) may be set for each parameter with change rate over time, and then the dead band may be used. When the state value is equal to or more than (the upper limit value−α) for each parameter, and the change rate of the parameter is equal to or more than a setting value, the state value of the parameter is determined to be close to the upper limit value. On the other hand, when the state value is equal to or more than (the upper limit value−α) for each parameter but the change rate of the parameter is less than a setting value, the state value of the parameter may not be determined to be close to the upper limit value. However, when the change rate of the state value of the parameter is very small but the state value is equal to or more than (the upper limit value−α) continuously, the state value of the parameter may be determined to be close to the upper limit value. Accordingly, it is possible to prevent the following issue: when the state value exists around (the upper limit value−α), the determination result may change with a cycle, and a warning display explained later repeatedly disappears and appears on the display.

When the warning display unit 106 receives a notification from the determination unit 104, the warning display unit 106 commands the display device 30 to display, concerning the parameter of which state value is determined to be close to the upper limit value, a warning icon 135 for warning the user on the radar chart 131 of the screen 130 as illustrated in FIG. 4. The warning method may be, for example, displaying a warning icon image in proximity to the label of the parameter, emphasizing the label of the parameter, changing the color, or blinking the display. More specifically, the warning display unit 106 displays warning information on the screen 130 so that the user can be notified of the parameter for which the warning is issued.

When a plurality of levels of upper limit values are provided in the determination unit 104, the warning display unit 106 may change the type, the color, the blinking speed of the icon in accordance with the level, so that the display processing may be respectively performed to allow the user to recognize the different level, that is, the difference of the degree of urgency of warning. Further, when the state value is more than the upper limit value, the warning display unit 106 may display a warning message, a warning icon, or the like to emphasize and notify them more strongly to the user. The warning message may be displayed, for example, in a pop up window.

The countermeasure storage unit 108 stores a countermeasure table 120 as illustrated in FIG. 3. As illustrated in FIG. 3, the countermeasure table 120 stores, in association with each parameter, at least one candidate of countermeasure for improving or solving an occurrence when the state value is close to the upper limit value. The countermeasures include those that are done in a stepwise manner (for example, after low-performance machines are discarded, power-saving machines are introduced) and those that are done with a combination. The countermeasure table 120 stores relationships of countermeasures in association therewith.

Countermeasures that are different depending on the target on which countermeasures are taken (for example, in a case of facilities and in a case of floors, or in each floor (the first floor and the second floor), or season or a period of time when countermeasures are taken) may be provided. The countermeasure table 120 may hold the target of each countermeasure in association therewith. The countermeasure table 120 may hold the status indicating whether each countermeasure is already carried out or not in association therewith. When a plurality of levels of upper limit values are provided in the determination unit 104, stepwise countermeasures may be provided for the levels. The countermeasure table 120 may hold the countermeasures for the levels in association therewith.

Back to FIG. 2, when the state value is close to the upper limit value for each parameter, the countermeasure display unit 110 displays countermeasures for improving this state. When the countermeasure display unit 110 receives a notification from the determination unit 104, the countermeasure display unit 110 receives a parameter of which state value is determined to be close to the upper limit value. Then, the countermeasure display unit 110 looks up the countermeasure table 120 of the countermeasure storage unit 108, and obtains a candidate of countermeasure corresponding to the parameter. Then, the countermeasure display unit 110 commands the display device 30 to display, as a list table or the like, candidates of countermeasures obtained in the countermeasure list 136 of the screen 130 as illustrated in FIG. 4.

As illustrated in FIG. 4, the countermeasure list 136 includes an improvement measure display field 138 and a status display field 140. Each countermeasure (indicated as "improvement measure" in FIG. 4) displayed in the improvement measure display field 138 is provided with a checkbox 142. The user may use the input device 40 to check the checkbox 142 of the countermeasure on the screen 130, thereby selecting the countermeasure. Selection of a countermeasure may be received using, for example, not only the checkbox but also a radio button for selecting one of choices. In addition, various kinds of graphical user interfaces (GUIs) such as an operation button, an icon, an item selection list, a menu, or a link may be used. In the status display field 140 of each countermeasure, information indicating whether the countermeasure is already taken or not yet, for example, "not yet", "finished", "scheduled to be employed (in preparation)", or the like are displayed as the status of the countermeasure. When it is in preparation, the scheduled date when it will be carried out may be displayed. When, on this screen 130, the user selects an arrow of the status display field 140 using the input device 40, the countermeasures may be sorted for each status.

The countermeasures displayed on the countermeasure list 136 are preferably displayed in such a manner that, concerning those that are done in a stepwise manner (for example, after low-performance machines are discarded, power-saving machines are introduced) and those that are done with a combination, the relationship therebetween can be understood. For example, when a plurality of countermeasures are taken in a stepwise manner, they are displayed so that the relationship between a plurality of countermeasures can be understood.

For example, FIG. 4 illustrates an example where a plurality of countermeasures are preferably taken in a stepwise manner. In FIG. 4, two countermeasures including "low-performance machines are discarded" and further "power-saving machines are introduced" indicate that countermeasures are preferably taken as follows. In the first step, "low-performance machines are discarded", and thereafter, in the second step, "power-saving machines are introduced". In order to teach the user that the countermeasures are preferably taken in a stepwise manner, the level display section 144 is used to display the countermeasures in such a manner that the level of the countermeasure of "introducing the power-saving machines" is intended to be lower than that of the countermeasure of "discarding the low-performance machines".

It should be noted that it is not necessary to select the higher level at first. In the example of FIG. 4, it may be possible to select only the lower level so as to "introduce power-saving machines" without "discarding low-performance machines". Concerning the items that are required to be performed in a stepwise manner at all times, it is preferable to allow the user to make selection in the only descending order of the level, that is, from the higher level to the lower level.

In the present exemplary embodiment, as illustrated in FIG. 4, the radar chart 131 and the countermeasure list 136 are displayed in the same screen 130, but the exemplary embodiment is not limited thereto. The radar chart 131 and the countermeasure list 136 may be in separate windows. Alternatively, the countermeasure list 136 may not be displayed at normal circumstances, and it may be displayed only when the warning display unit 106 displays a warning or when the user commands the display. For example, when the user performs operation to select a label 132 of a parameter for which a warning is displayed in the screen 130, a countermeasure list 136 including a countermeasure for the parameter may be displayed in the screen 130 or in a separate window.

As illustrated in FIG. 7, in the present exemplary embodiment, for a certain parameter, the state values classified into details, for example, floors, may also be displayed, instead of the value of the entire data center 5. Alternatively, it may be possible to display in such a manner that the state of the entire data center 5 and the state of each floor can be compared. In FIG. 7, a parameter selected by a list (not shown) is displayed in a selection target parameter display section 162. On a screen 160, a radar chart 131 indicating the state value of each floor and the upper limit value is displayed with regard to the power supply electric power selected from among the parameters. In the radar chart 131 of FIG. 7, four floors A, B, C, and D are allocated to four axes, and a corresponding floor is displayed in a label 164. The upper limit value of the selected parameter (power supply electric power) is displayed in the upper limit value display portion 133, and the state value of each floor is displayed in the state display portion 134. It should be noted that the upper limit value of the parameter may be set differently for each floor. When the upper limit value is different for each target (for example, floors), the upper limit value of the parameter of the entire data center 5 may be the average value of the upper limit values of the targets, or may be the minimum upper limit value of the targets.

Further, the countermeasure list 136 of the screen 160 may include countermeasures for the floors for each floor display field 166. As illustrated in FIG. 7, for example, when the state value of the power supply electric power of the floor B is as large as the borderline upper limit value, a countermeasure may be displayed to suggest moving the machines to the floor A or D where the power supply electric power is sufficient. As described above, when countermeasures can be provided for each floor, the conditions thereof and these countermeasures may be stored in association therewith in the countermeasure storage unit 108.

Operation of the display processing system 1 according to the present exemplary embodiment configured as described above will be explained below.

Figure 6:
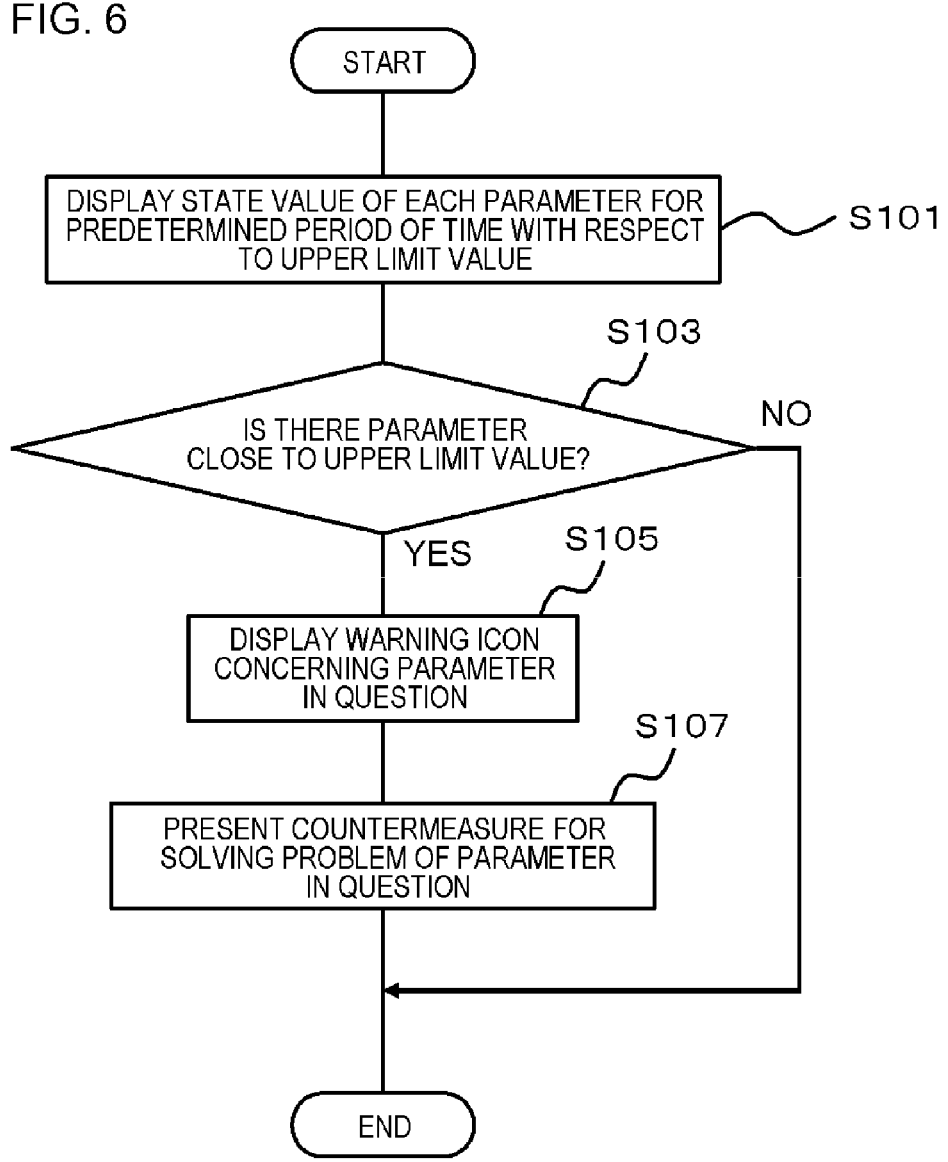
FIG. 6 is a flowchart illustrating an example of operation of the display processing system according to the exemplary embodiment of the present invention.

FIG. 6 is a flowchart illustrating an example of operation of the display processing system 1 according to the present exemplary embodiment. Hereinafter, explanation will be made with reference to FIGS. 1 to 4 and 6.

Ina display processing method according to the present exemplary embodiment, the display processing apparatus 100 (FIG. 2) displays a state value of each parameter for a predetermined period of time with respect to the upper limit value on the display device 30 (FIG. 1) for a plurality of parameters each having the upper limit value (step S101), determines, for each parameter, whether the state value is close to the upper limit value or not (step S103), displays a warning to a user on the display device 30 (FIG. 1) with regard to a parameter which is determined that the state value is close to the upper limit value (step S105), and displays, for each parameter, countermeasures for improving the state on the display device 30 (FIG. 1) when the state value is close to the upper limit value (step S107).

More specifically, first, in the display processing system 1 according to the present exemplary embodiment, the state display unit 102 (FIG. 2) of the display processing apparatus 100 displays the radar chart 131 (FIG. 4) showing a state value of each parameter on the screen 130 (FIG. 4) of the display device 30 for a predetermined period of time with respect to the upper limit value for a plurality of parameters each having the upper limit value (step S101).

Then, the determination unit 104 (FIG. 2) of the display processing apparatus 100 determines, for each parameter, whether the state value is close to the upper limit value or not (step S103). When the determination unit 104 determines that it is necessary to take measures concerning the parameter of which state value is determined to be close to the upper limit value (YES in step S103), the determination unit 104 notifies the warning display unit 106 and countermeasure display unit 110 to that effect. When there is no parameter of which state value is close to the upper limit value (NO in step S103), or when it is determined that it is not necessary to take countermeasures for the parameter of which state value is determined to be close to the upper limit value, this processing is terminated.

The warning display unit 106 (FIG. 2) of the display processing apparatus 100 receives a parameter of which state value is determined to be close to the upper limit value from the determination unit 104, and displays, on the display device 30, the warning icon 135 (FIG. 4) at a side of the label 132 of the corresponding parameter in the radar chart 131 (FIG. 4) of the screen 130 for the received parameter (step S105).

Further, the countermeasure display unit 110 (FIG. 2) of the display processing apparatus 100 receives a parameter of which state value is determined to be close to the upper limit value from the determination unit 104, looks up the countermeasure table 120 (FIG. 3) of the countermeasure storage unit 108 (FIG. 2) of the display processing apparatus 100, obtains a countermeasure corresponding to the received parameter, and displays the countermeasure in the countermeasure list 136 (FIG. 4) of the screen 130 on the display device 30 (step S107).

As described above, according to the display processing system 1 according to the present exemplary embodiment, the states of a plurality of parameters having the upper limit values are displayed, and a warning is displayed for the parameter of which state value is close to the upper limit value and involves a problem, and a solution for the problem is presented. Therefore, the user can recognize, at a glance, the parameter of which state value is close to the upper limit value, and the user can learn the countermeasure. This makes it easy to understand the problem, and the solution suitable for the problematical point can be found in the list table. Therefore, appropriate countermeasures can be taken, and as a result, this improves the efficiency and the reliability of the system management.

Second Exemplary Embodiment

Figure 8:
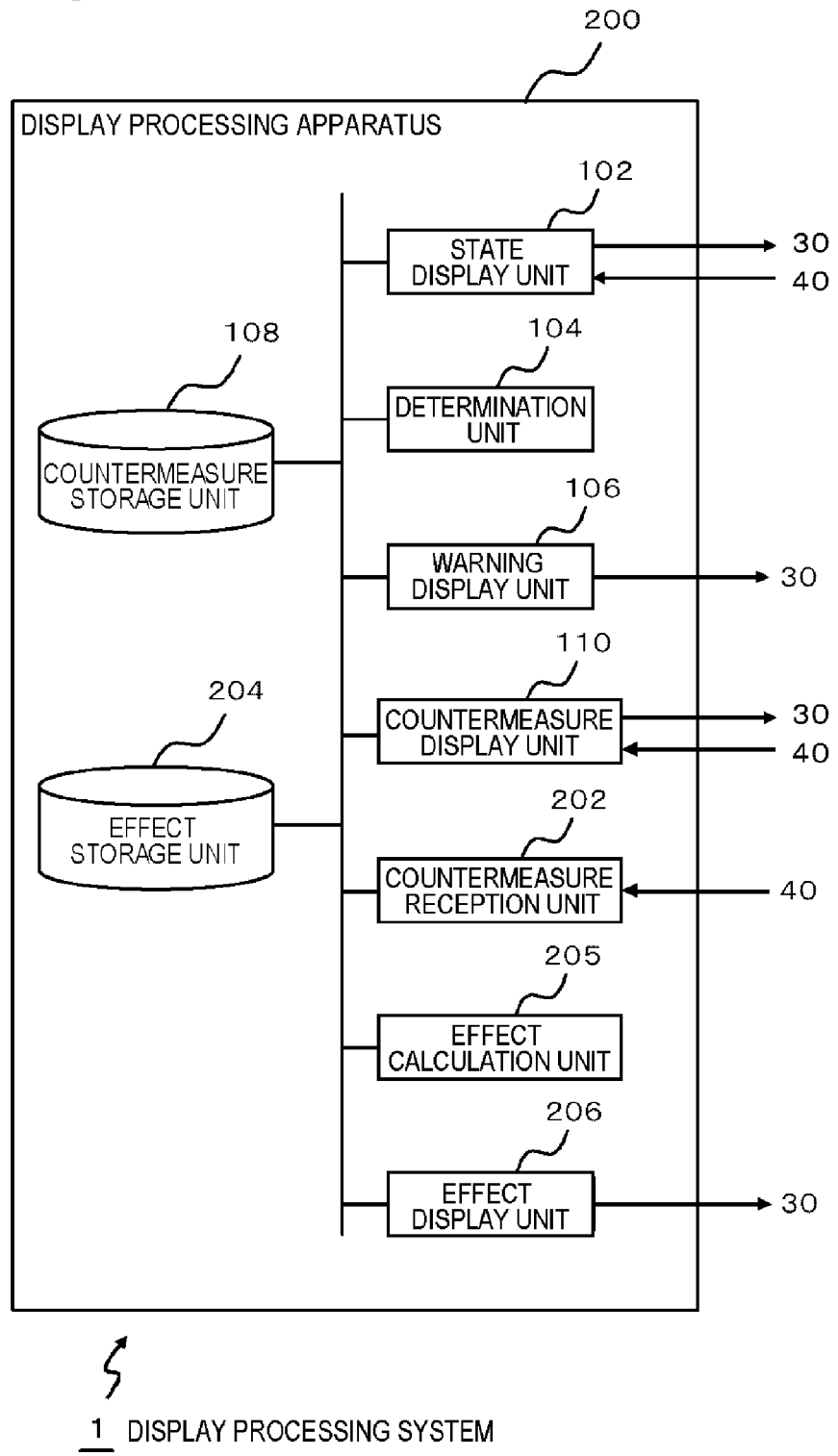
FIG. 8 is a functional block diagram illustrating a configuration of a display processing apparatus of the display processing system according to an exemplary embodiment of the present invention.

FIG. 8 is a functional block diagram illustrating a configuration of a display processing apparatus 200 achieved by a computer of a display processing system 1 according to the exemplary embodiment of the present invention. The display processing system 1 according to the present exemplary embodiment is different from that of the above exemplary embodiment in that, when a user selects a countermeasure displayed on the countermeasure list 136 of the screen 130, the display processing system 1 according to the present exemplary embodiment predicts an effect of the selected countermeasure and presents it to the user.

The display processing apparatus 200 according to the present exemplary embodiment includes not only the configuration of the display processing apparatus 100 of the above exemplary embodiment of FIG. 2 but also a countermeasure reception unit 202 that receives an operation command for selecting a countermeasure displayed by the countermeasure display unit 110, an effect calculation unit 205 that calculates, as change of the state value for each parameter, an effect obtained from the countermeasure selected by the received operation command when the operation command is received, and an effect display unit 206 that displays the change of the state value of each parameter thus calculated.

More specifically, the display processing system 1 according to the present exemplary embodiment includes the configuration of the display processing apparatus 100 of the above exemplary embodiment of FIG. 2 and in addition, the display processing system 1 according to the present exemplary embodiment includes the countermeasure reception unit 202, an effect storage unit 204, the effect calculation unit 205, and the effect display unit 206.

Figure 10:
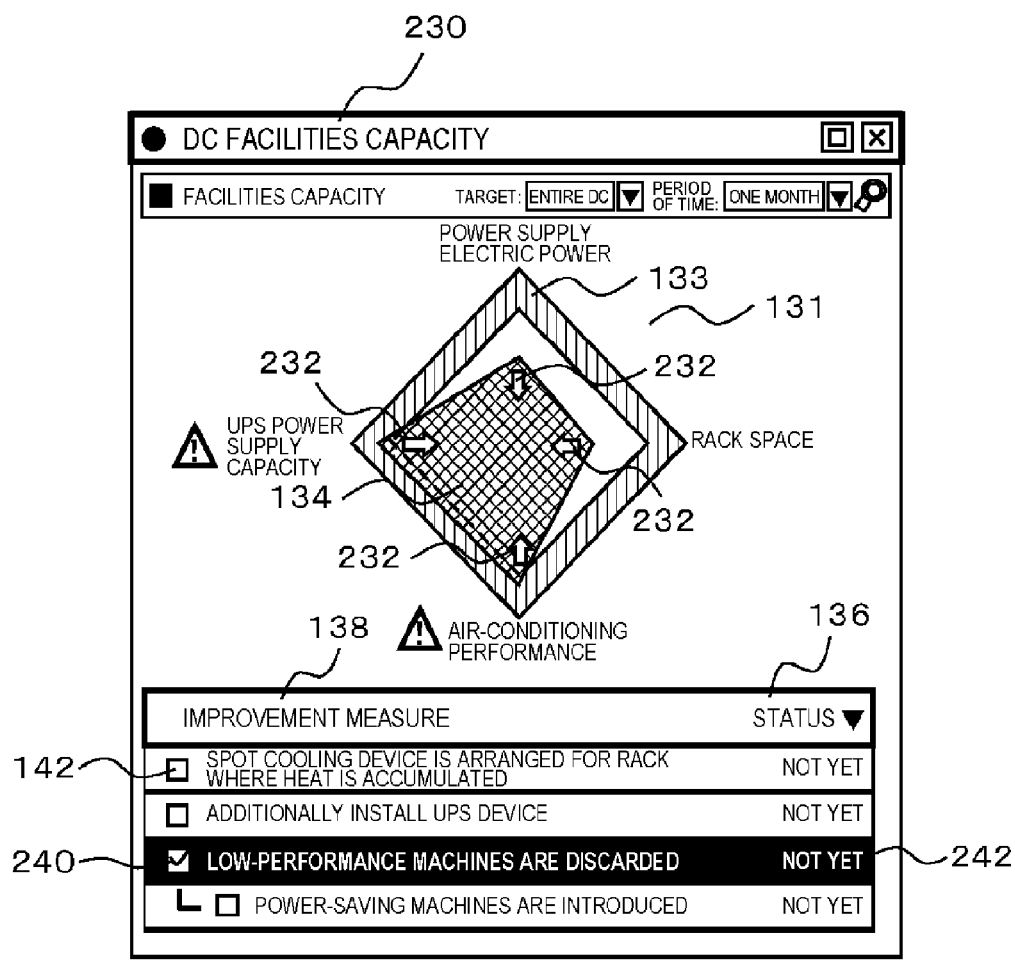
FIG. 10 is a figure illustrating an example of a display screen of the display processing system according to the exemplary embodiment of the present invention.

The countermeasure reception unit 202 receives selection of a checkbox 142 of a countermeasure list 136 of a screen 230 of FIG. 10, which is selected by the user manipulating the input device 40. At this occasion, a check 240 is displayed in the selected checkbox 142. The selected countermeasure is in a reversed indication 242. Selection of a countermeasure may be received using, for example, not only the checkbox but also a radio button for selecting one of choices. In addition, various kinds of graphical user interfaces (GUIs) such as an operation button, an icon, an item selection list, a menu, and a link may be used.

Back to FIG. 8, the effect storage unit 204 stores, as the effect obtained from the countermeasure, change of the state value of each parameter in association with the countermeasure. For example, as illustrated in FIG. 9, the effect storage unit 204 stores, for each countermeasure, the effect table 210 in which the effect is associated with each parameter. In the present exemplary embodiment, the effect is represented by a degree of change of the state value of each parameter. For example, the change width of the state value of the parameter may be classified into several degrees in plus and minus, and may be set using numerical values (for example, 0, ±1, ±2, ±3, . . . , in percentage terms, or the like). Further, effects may be set differently for each target such as floors, rooms, or the like.

Concerning the relationship between the countermeasure and the effect, the user may change setting using a setting screen (not shown), and these relationships are described in association with each other in the effect table 210, and stored in the effect storage unit 204.

Back to FIG. 8, when the effect calculation unit 205 receives the operation command, the effect calculation unit 205 looks up the effect storage unit 204 to calculate, as change of the state value for each parameter, the effect obtained when the selected countermeasure is taken in response to the received operation command. The amount of change of the state value indicating the effect caused by the countermeasure of the parameter may be calculated in association with the scheduled magnitude of execution of the countermeasure. For example, the screen 230 (FIG. 10) may allow selection of the magnitudes of the number of machines discarded and the number of machines newly introduced. Accordingly, the effect calculation unit 205 may calculate the amount of change of the state value indicating the effect also in view of the scheduled magnitude of execution. The amount of change may be stored in advance to the effect storage unit 204 in association with the scheduled magnitude of execution. Then, the effect calculation unit 205 may calculate the amount of change of the state value indicating the effect by multiplying the amount of change of the effect storage unit 204 by a coefficient according to the scheduled magnitude of execution during the calculation.

When the countermeasure reception unit 202 receives the operation command, the effect display unit 206 displays the effect obtained when the selected countermeasure is taken in response to the received operation command. The effect may be represented by the degree of change of the state value of each parameter. More specifically, the effect calculation unit 205 looks up the effect storage unit 204 to obtain the change of the state value of each parameter corresponding to the countermeasure selected by the user, and when a plurality of countermeasures are selected, the amounts of changes are added for each parameter. Then, the effect display unit 206 displays information indicating the effect obtained when the countermeasure is taken, in proximity to the display of the state value of the parameter based on the amount of change thus calculated. The information indicating the effect may be information indicating increase or decrease of change of the state value of the parameter, and, for example, it may be represented using an image such as an icon of an arrow 232 of FIG. 10.

In the present exemplary embodiment, with respect to each axis of the radar chart 131, the increase or decrease of the change of the state value of the parameter is represented with a direction such as an icon of the arrow 232, but the exemplary embodiment is not limited thereto. For example, the increase or decrease of the change of the state value may be represented using a symbol ±, numerical values such as "0, ±1, ±2, . . . ", or the like. The color of the indication of the icon and the numerical value may be changed and displayed. For example, when the state value increases and becomes close to the upper limit value, they are changed and displayed in red, and when the state value decreases and becomes greatly different from the upper limit value, they are changed and displayed in blue. Further, when the state value increases and becomes close to the upper limit value, the visibility to the user may be increased by blinking and emphasizing the display. When the state value further increases and becomes more than the upper limit value, a warning message, a warning icon, or the like may be displayed so as to notify the user in a more emphasized manner.

The effect display unit 206 displays information representing the degree of the change of the state value of the parameter with respect to the upper limit value. The effect display unit 206 may display, in a stepwise manner, the degree of the change of the state value of the parameter with respect to each axis of the radar chart 131. For example, the degree of the change may be represented by changing, in a stepwise manner, the length or the size of the arrow, the change of the color of the arrow, or the like. As described above, in the present exemplary embodiment, the effect display unit 206 displays the information indicating the effect that is expected when the countermeasure is taken, that is, the information representing the degree of the change of the state value of the parameter.

For example, as illustrated in FIG. 9, when a countermeasure P1 is selected, the amount of change of a parameter A is +2. When a countermeasure P2 is selected, the amount of change of the parameter A is +1, and the total amount of change of the countermeasure P1 and the countermeasure P2 becomes +3. On the other hand, when the similar countermeasure is selected, the total amount of change of the parameter B becomes −3+1=−2. In this case, plus (+) indicates that the state value of the parameter changes to decrease (become smaller) due to the countermeasure, and minus (−) indicates that the state value of the parameter changes to increase (become larger) due to the countermeasure. The larger the magnitude of the numerical value is, the larger the effect (or action) caused by the countermeasure is.

The effect display unit 206 displays upon changing the direction and the length of the arrow 232 displayed in the radar chart 131 of FIG. 10 based on the amount of change thus calculated. In FIG. 10, when the amount of change is plus, the arrow 232 is displayed toward the inner side of the state display portion 134 of the radar chart 131. On the other hand, when the amount of change is minus, the arrow 232 is displayed toward the outer side of the state display portion 134 of the radar chart 131. The larger the absolute value of the amount of change is, the longer the length of the arrow 232 may be displayed.

When the change of the state value of the parameter due to the countermeasure may be predicted, the effect display unit 206 may display the changed state value by plotting the changed state value on the radar chart 131 so as to allow comparison with the state value using a different line (different color, broken line, or the like) which is different from the indication of the state value (the state display portion 134). Alternatively, the changed state value may be displayed in a separate window.

In the display processing system 1 according to the present exemplary embodiment, the effect caused by the countermeasure has correlation relationship between parameters. Based on the correlation relationship, the amount of change of the state value of the parameter indicating the effect caused by the countermeasure is set in the effect table 210, and is stored in the effect storage unit 204.

In the present exemplary embodiment, prediction processing of the effect by the effect calculation unit 205 uses the effect table 210, but the exemplary embodiment is not limited thereto. For example, combination conditions of countermeasures may be described as a logical expression, predetermined program language, rule description language, or the like, and may be stored.

As described above, the effect calculation unit 205 looks up the effect table 210, reads the amount of change of the state value of the parameter indicating the effect caused by the countermeasure, and adds the amounts of changes for each parameter. In this manner, the effect calculation unit 205 may respectively calculate, as the change of the state value of each parameter, the effect caused by the countermeasure selected by the received operation command.

Figure 11:
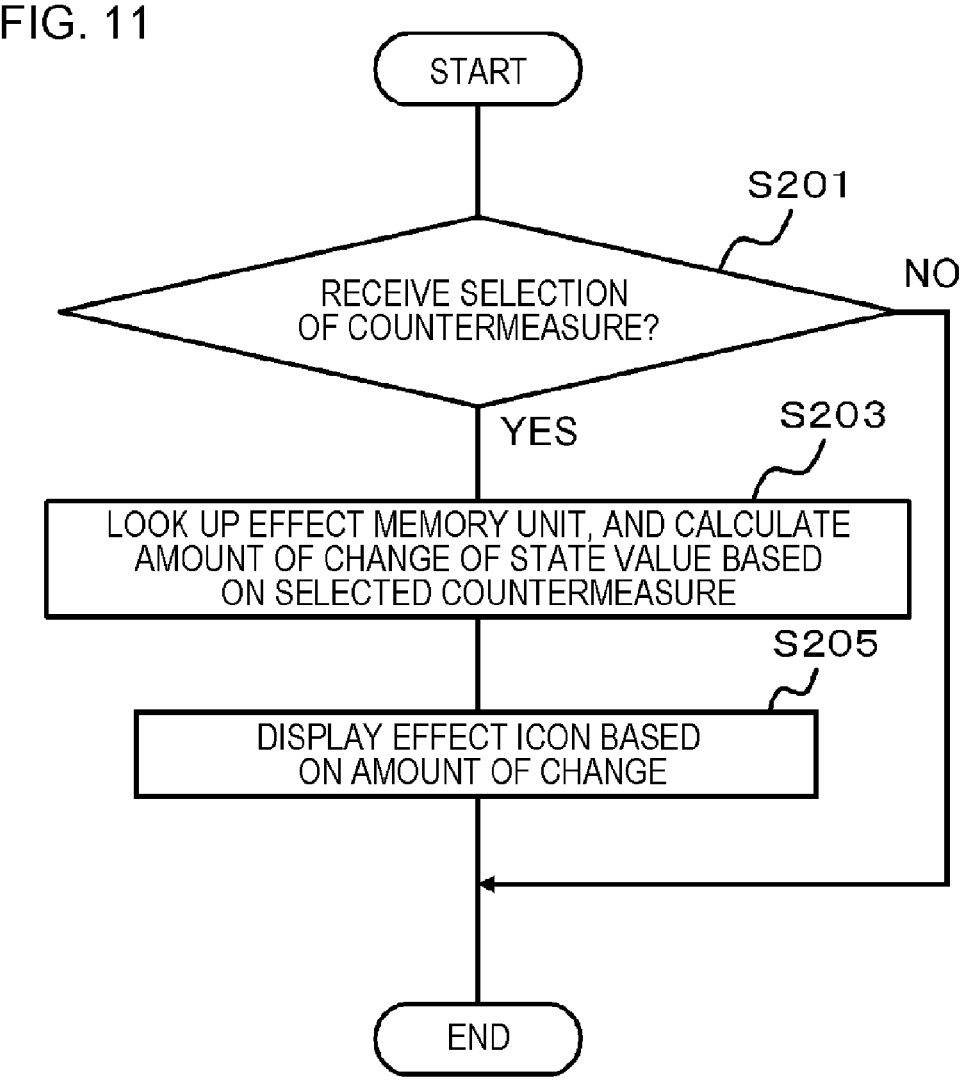
FIG. 11 is a flowchart illustrating an example of operation of the display processing system according to the exemplary embodiment of the present invention.

Operation of the display processing apparatus 200 of the display processing system 1 according to the present exemplary embodiment configured as described above will be explained below. FIG. 11 is a flowchart illustrating an example of operation of the display processing apparatus 200 of the display processing system 1 according to the present exemplary embodiment. Hereinafter, explanation will be made with reference to FIGS. 8 to 11.

In the present exemplary embodiment, suppose that the countermeasure list 136 and the radar chart 131 indicating the state value of each parameter as illustrated in FIG. 4 are already displayed. In this state, the countermeasure reception unit 202 (FIG. 8) of the display processing apparatus 200 receives a countermeasure selected when the user uses the input device 40 to perform operation (YES in step S201). This processing is repeatedly processed while the countermeasure list 136 (FIG. 10) of the screen 230 is displayed. More specifically, while the countermeasure list 136 (FIG. 10) of the screen 230 is displayed, reception of a selection operation command is monitored in step S201, and when the operation command is received (YES instep S201), step S203 is subsequently performed.

Then, the effect calculation unit 205 (FIG. 8) of the display processing apparatus 200 looks up the effect table 210 (FIG. 9) of the effect storage unit 204 of the display processing apparatus 200, and calculates the amount of change of the state value of each parameter based on the selected countermeasure (step S203). Then, based on the amount of change thus calculated, the effect display unit 206 of the display processing apparatus 200 displays an arrow 232 of an icon indicating the effect (step S205).

As explained above, according to the display processing system 1 according to the present exemplary embodiment, the same effects as those of the above exemplary embodiment are achieved, and the user simply selects a countermeasure for solving the problem from among the candidate list table of the solutions to find the effect and the influence to others, which are caused when the countermeasure is executed. Then, while the user changes the selection pattern from the countermeasure candidates, the user compares and considers the effect for each pattern, and the user can select the best countermeasure pattern from among them. What kind of influence is caused on another parameter having correlation relationship when countermeasure is taken for a certain parameter is displayed on the screen 230 as the amount of change of the state value of each parameter, and therefore, the user can select the best countermeasure in view of the influence of another countermeasure.

Third Exemplary Embodiment

Figure 12:
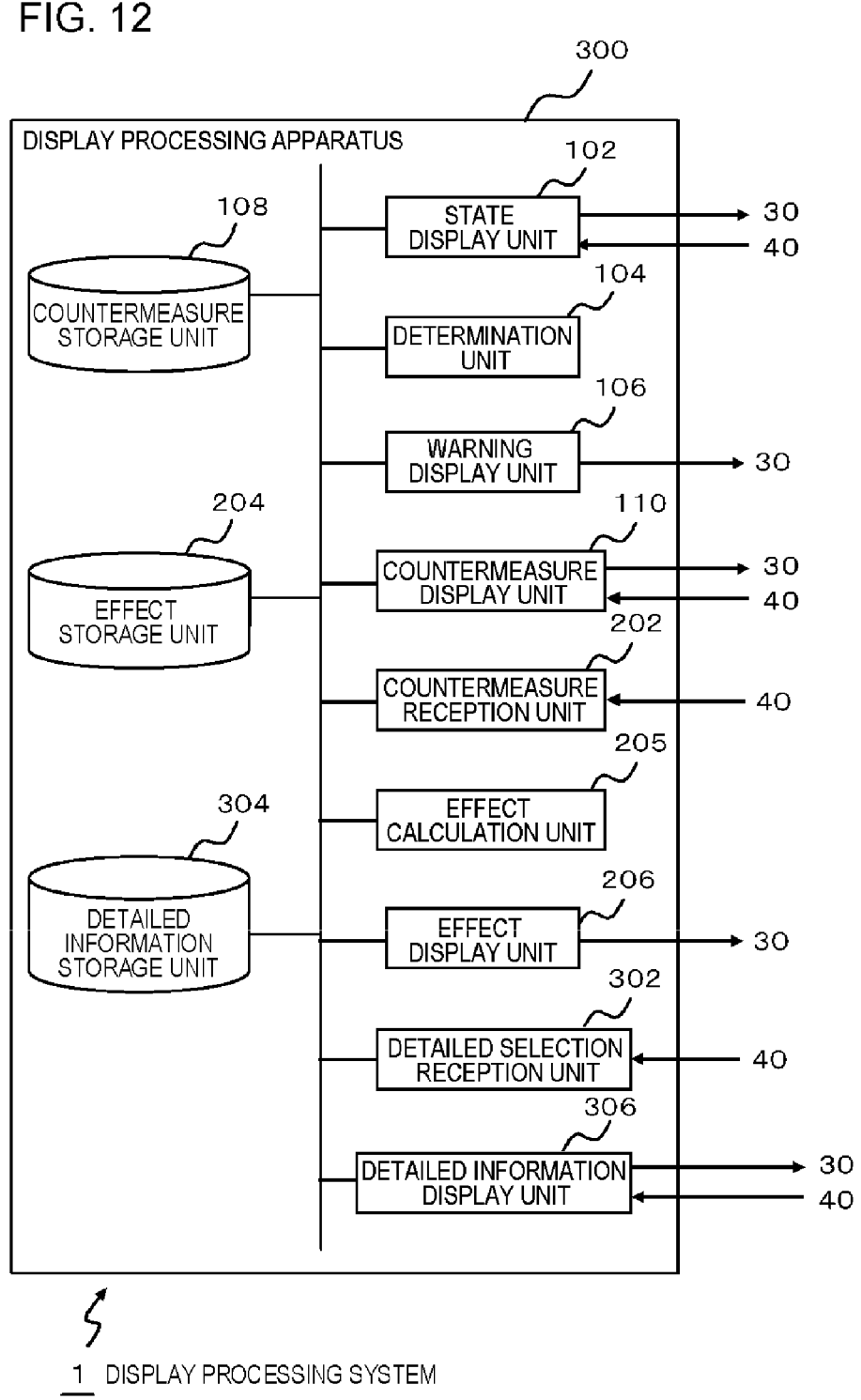
FIG. 12 is a functional block diagram illustrating a configuration of a display processing apparatus of the display processing system according to an exemplary embodiment of the present invention.

FIG. 12 is a functional block diagram illustrating a configuration of a display processing apparatus 300 achieved by a computer of a display processing system 1 according to the exemplary embodiment of the present invention. The display processing system 1 according to the present exemplary embodiment is different from that of the above exemplary embodiments in that the display processing system 1 according to the present exemplary embodiment presents detailed information about each parameter to a user.

The display processing apparatus 300 according to the present exemplary embodiment includes not only the configuration of the display processing apparatus 200 of the above exemplary embodiment of FIG. 8 but also a detailed selection reception unit 302, a detailed information storage unit 304, and a detailed information display unit 306.

Alternatively, the display processing system 1 according to the present exemplary embodiment may include the configuration of the display processing apparatus 100 of the above exemplary embodiment of FIG. 2 and in addition, include the detailed selection reception unit 302, the detailed information storage unit 304, and the detailed information display unit 306.

Figure 13:
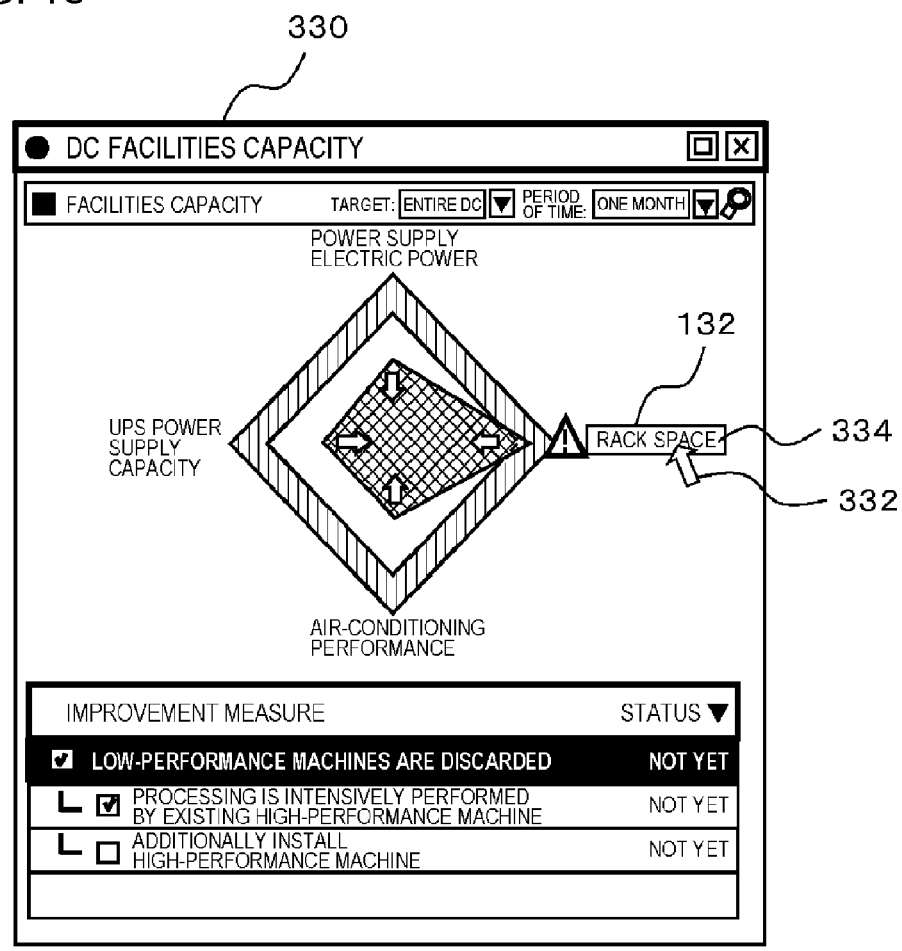
FIG. 13 is a figure illustrating an example of a display screen of the display processing system according to the exemplary embodiment of the present invention.

In the present exemplary embodiment, as illustrated in FIG. 13, when, on a screen 330, the user uses an input device 40 to move a mouse pointer 332 to a label 132 of a parameter to select it, the selected label 132 is in reversed indication 334, and detailed information about the selected parameter is displayed on the screen.

The detailed selection reception unit 302 receives a parameter selected by the user to display the detailed information. The detailed information storage unit 304 stores the detailed information about each parameter. For example, detailed information about rack space may include, for example, layout information in floor, arrangement information of racks in floor, information about the number of units that can be accommodated in a rack and the number of units accommodated therein, and an occupancy rate of rack calculated from the number of units that can be accommodated in a rack and the number of units accommodated therein.

The above information may include information of the past, and may be stored as history information.

The detailed information display unit 306 obtains the detailed information related to the parameter received by the detailed selection reception unit 302 from the detailed information storage unit 304, and displays it on the display device 30.

Figure 14:
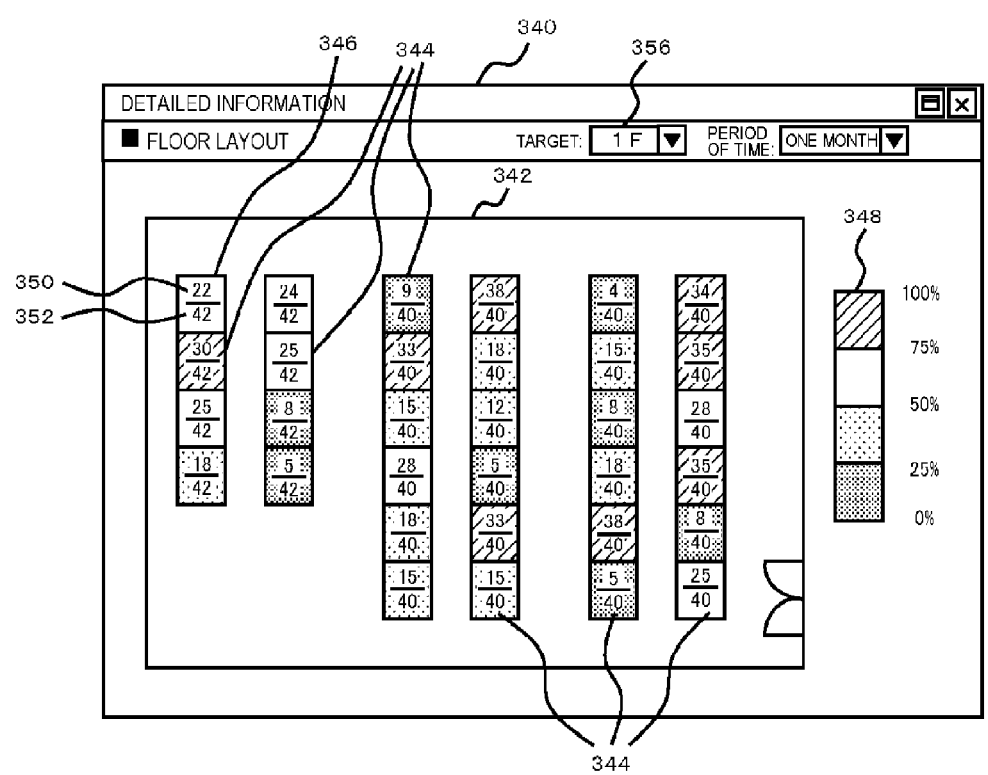
FIG. 14 is a figure illustrating an example of a display screen of the display processing system according to the exemplary embodiment of the present invention.

For example, accommodation situation of each rack as well as floor layout are displayed on a screen 340 as illustrated in FIG. 14. As illustrated in a legend 348, occupancy rate of each rack may be displayed in an easy-to-understand manner by classifying the rate into four levels. The floor displayed in the screen 340 may be selected from a list, and the selected floor is displayed in a selection target floor display section 356. Like the screen 130 of FIG. 4, a period of time may also be selected. In a floor layout diagram 342, the layout of a rack 346 is displayed, and the number of mountable units is displayed in a display section 352 and the number of used units is displayed in a display section 350 for each rack row 344 of the rack 346.

Figure 15:
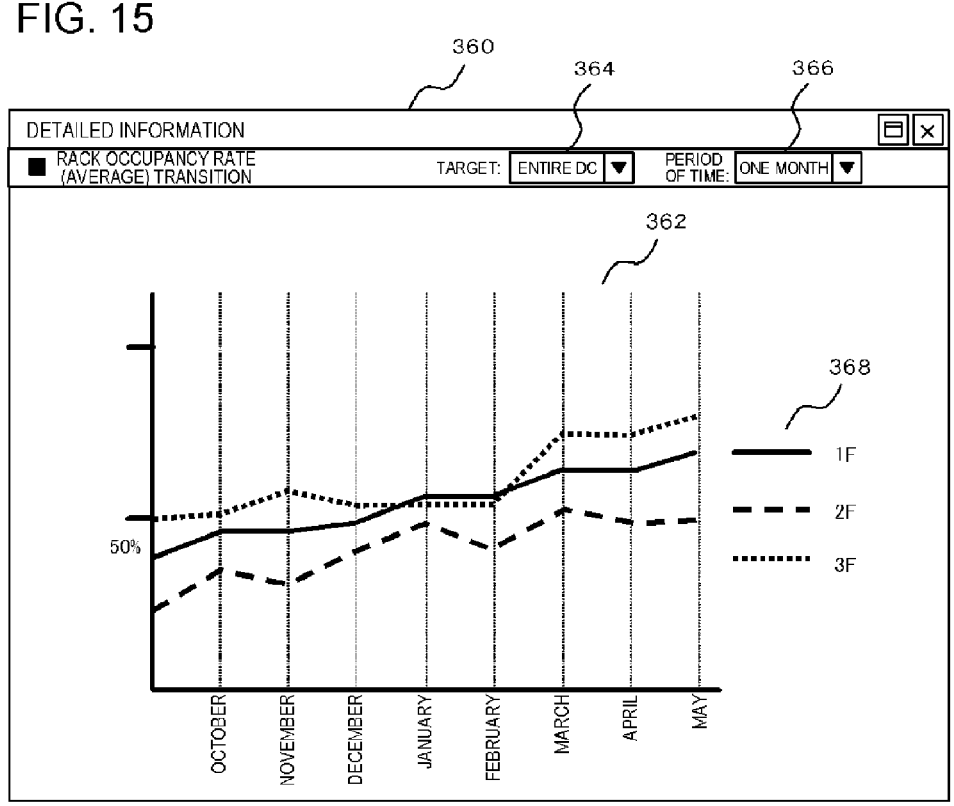
FIG. 15 is a figure illustrating an example of a display screen of the display processing system according to the exemplary embodiment of the present invention.

Another example of detailed information is a screen 360 of FIG. 15, in which transition of the average value of the rack occupancy rate is displayed as a line graph. As illustrated in a legend 368, change of occupancy rate for each month for each floor is displayed in a rack occupancy rate transition graph 362. As illustrated in FIG. 15, information about all the floors of the data center 5 may be displayed at a time, or a floor may be selected from a list, and only information about the particular floor may be displayed. In FIG. 15, as illustrated in a selection target floor display section 364, information about the entire data center 5 is displayed. A selected period display section 366 indicates that the average value of the occupancy rate is the average value for one month.

As explained above, according to the display processing system 1 according to the present exemplary embodiment, the same effects as those of the above exemplary embodiments are achieved, and in addition, the detailed information about each parameter can be displayed, and therefore, when a countermeasure is selected, the most suitable countermeasure can be selected in view of the detailed information.

Fourth Exemplary Embodiment

Figure 16:
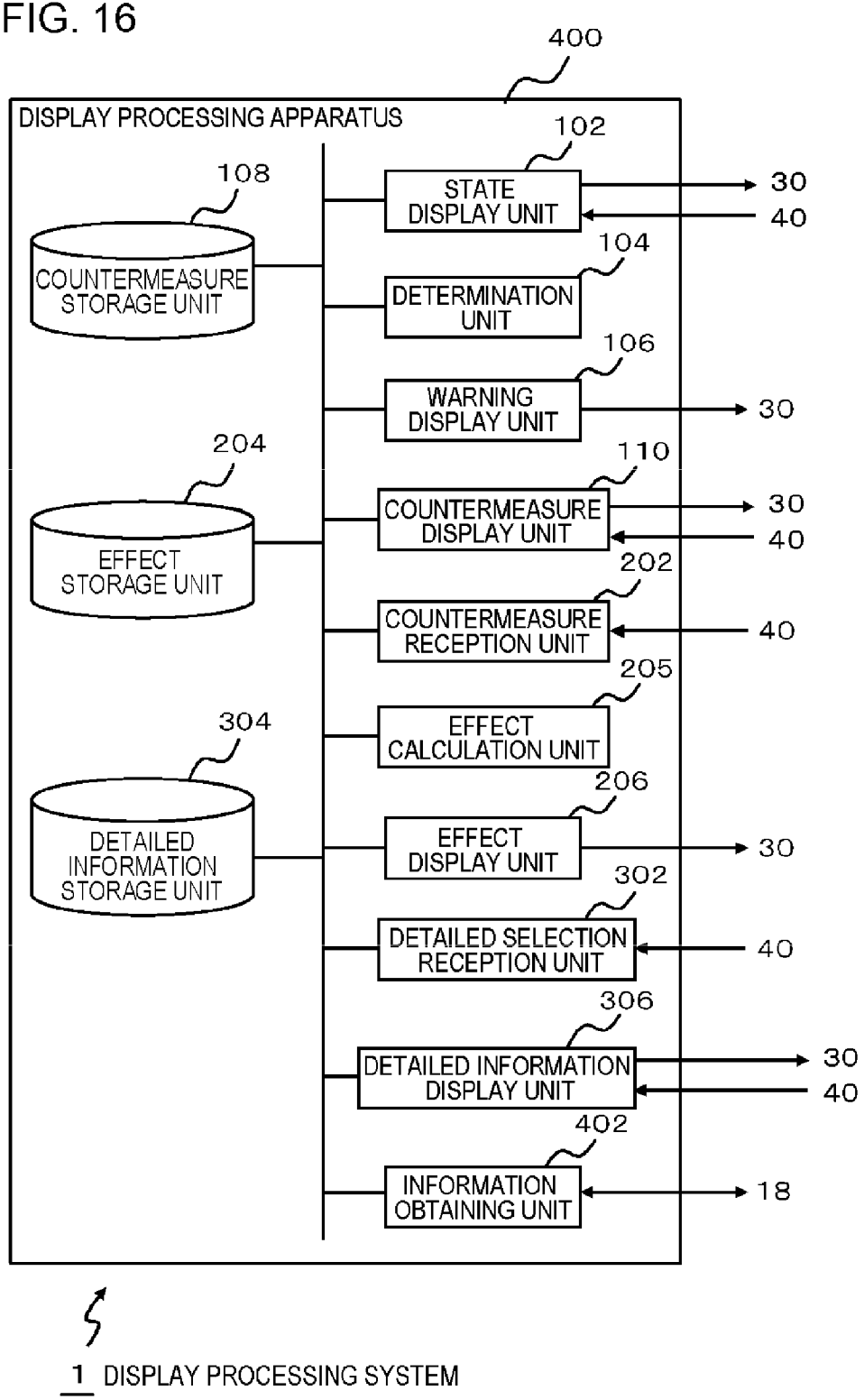
FIG. 16 is a functional block diagram illustrating a configuration of a display processing apparatus of the display processing system according to an exemplary embodiment of the present invention.

FIG. 16 is a functional block diagram illustrating a configuration of a display processing apparatus 400 achieved by a computer of a display processing system 1 according to the exemplary embodiment of the present invention. The display processing system 1 according to the present exemplary embodiment is different from that of the above exemplary embodiments in that the display processing system 1 according to the present exemplary embodiment collects various kinds of information from a computer on a network 3 through an interface 18, and displays a state value of a parameter based on the collected information.

The display processing apparatus 400 according to the present exemplary embodiment includes not only the configuration of the display processing apparatus 300 of the above exemplary embodiment of FIG. 12 but also an information obtaining unit 402.

The display processing system 1 according to the present exemplary embodiment may include the configuration of the display processing apparatus 100 or the display processing apparatus 200 of the above exemplary embodiment of FIG. 3 or 8, and in addition, include an information obtaining unit 402.

The information obtaining unit 402 collects various kinds of information from the computer on the network 3 through the interface 18. The information collected by the information obtaining unit 402 includes, for example, information about a rack space, power supply electric power (kW), air-conditioning performance, or power supply capacity (kW or kVA) of uninterruptible power supply system (UPS) related to management of facilities of the data center 5, as well as information such as a CPU load rate, a memory capacity, or hard disk memory capacity related to resource (machine) management of a computer of the data center 5. The information obtaining unit 402 obtains the state values of various kinds of parameters from the information thus collected. The collection of the information by the information obtaining unit 402 may be achieved by causing, for example, information collected by a management server or the like of the data center 5 on the network 3 to be provided to the display processing apparatus 400.

The information collected by the information obtaining unit 402 may be stored to the detailed information storage unit 304.

Figure 17:
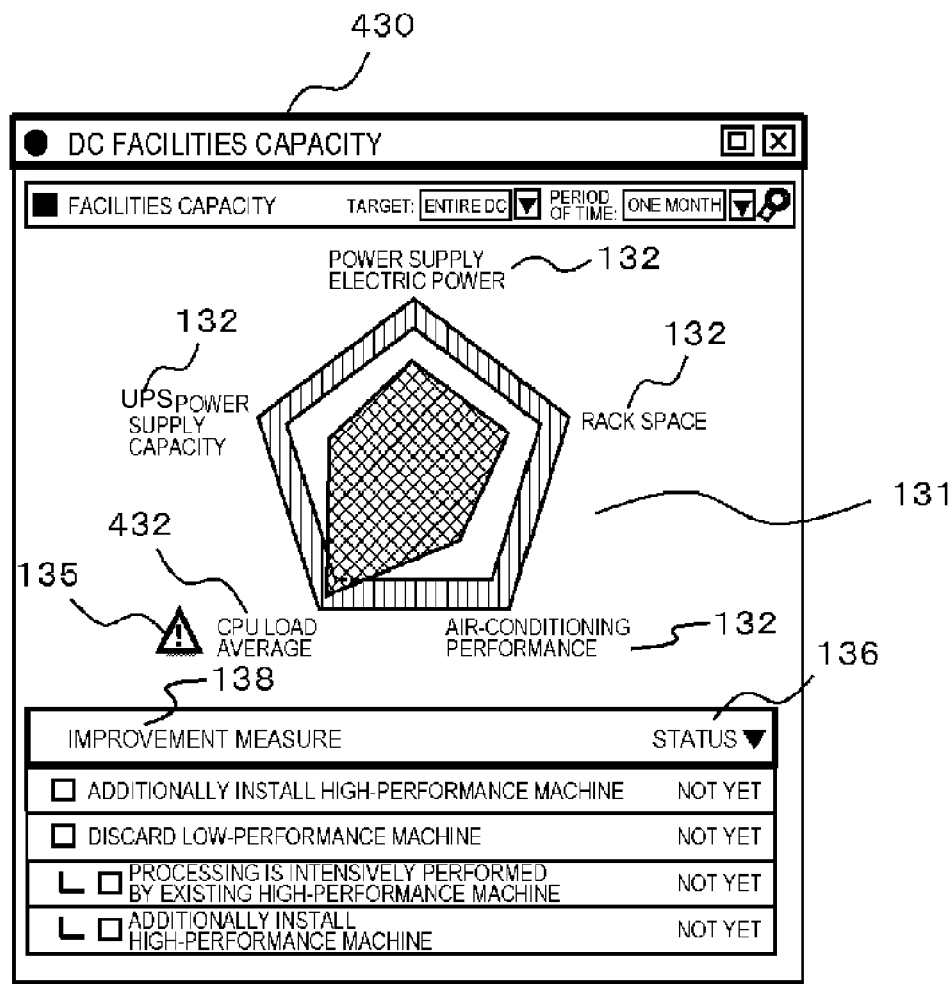
FIG. 17 is a figure illustrating an example of a display screen of the display processing system according to the exemplary embodiment of the present invention.

In the present exemplary embodiment, the state display unit 102 displays a screen 430 as illustrated in FIG. 17 on the display device 30. At this occasion, the state display unit 102 displays, on the display device 30, the state value of the parameter collected based on information collected by the information obtaining unit 402.

As described above, the display processing apparatus 400 of the display processing system 1 according to the present exemplary embodiment is different from, for example, the screen 130 of FIG. 4 of the above exemplary embodiment in that the display processing apparatus 400 may display not only the information related to the facilities management of the data center 5 but also the state values of various kinds of parameters related to the resource capacity information based on the information related to the resource management of the data center 5 and may display information about different management targets in an integrated manner.

As illustrated in FIG. 17, the radar chart 131 shows parameters (labels 132) related to facilities management such as the power supply electric power, the UPS power supply capacity, the rack space, or the air-conditioning performance like FIG. 4, and in addition, shows a parameter (label 432) of a CPU load average related to the resource management.

As explained above, according to the display processing system 1 according to the present exemplary embodiment, the same effects as those of the above exemplary embodiments are achieved, and in addition, data can be collected from the computer on the network 3, and therefore, the state value and the upper limit value can be compared and displayed with regard to the parameter based on various kinds of information. Further, based on the information related to facilities management of the data center 5 as well as the information related to resource management of the data center 5, the state values of various kinds of parameters related to the resource capacity information can be displayed, and while the effect caused by the countermeasure based on the correlation relationship is confirmed, the countermeasure can be considered, and therefore, the countermeasure can be taken in a more appropriate manner. As described above, the user can manage the computer system from various perspectives.

The exemplary embodiments of the present invention have been hereinabove explained with reference to drawings. However, they are merely examples of the present invention, and various configurations other than the above may also be employed.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2010-202199 filed on Sep. 9, 2010, the disclosure of which is incorporated herein in its entirety by reference.

The invention claimed is:

1. A display processing system comprising:
a state display unit which is configured to display, for a plurality of parameters each having an upper limit value, a state value of each parameter for a predetermined period of time with respect to said upper limit value;

a determination unit which is configured to determine, for each of said parameters, whether said state value is close to said upper limit value;

a warning display unit which is configured to display a warning to a user with regard to the parameter of which said state value is determined by said determination unit to be close to said upper limit value; and a countermeasure display unit which is configured to display, for each of said parameters, a countermeasure for improving the state when said state value is close to said upper limit value.

2. The display processing system according to claim 1 further comprising:

a reception unit which is configured to receive an operation command for selecting said countermeasure displayed by said countermeasure display unit;

a calculation unit which is configured to calculate, upon receiving said operation command, as change of said state value for each of said parameters, an effect obtained when said countermeasure selected by the received operation command is taken; and an effect display unit which is configured to display said change of said state value of each of said parameters thus calculated.

3. The display processing system according to claim 2, wherein said effect display unit is configured to display, as information indicating the effect obtained when said countermeasure is taken, information indicating an increase or decrease of said change of said state value of said parameter.

4. The display processing system according to claim 2, wherein said effect display unit is configured to display information representing a degree of the change of said state value of said parameter with respect to said upper limit value.

5. The display processing system according claim 2 further comprising a countermeasure storage unit which is configured to store, for each of said parameters, a countermeasure for improving a state when said state value is close to said upper limit value, wherein said countermeasure display unit is configured to look up, in said countermeasure storage unit, at least one countermeasure candidate, and to display a countermeasure corresponding to said parameter of which the state value is determined to be close to said upper limit value.

6. The display processing system according to claim 1, wherein said plurality of parameters comprise both of a parameter related to machine operation of a computer system and a parameter related to facilities management of said computer system.

7. The display processing system according to claim 1 further comprising a detailed information display unit which is configured to display detailed information related to said parameter.

8. The display processing system according to claim 1 further comprising a collecting unit which is configured to collect state values of a plurality of parameters each having an upper limit value, wherein said state display unit displays said state value of said parameter collected by said collecting unit.

9. A display processing method to be executed by a processing apparatus having a display unit, the method comprising:

displaying, for a plurality of parameters each having an upper limit value, a state value of each parameter for a predetermined period of time with respect to said upper limit value, on said display unit;

determining, for each of said parameters, whether said state value is close to said upper limit value or not;

displaying, on said display unit, a warning to a user with regard to a parameter of which said state value is determined to be close to said upper limit value; and displaying, for each of said parameters, a countermeasure for improving the state on said display unit when said state value is close to said upper limit value.

10. A computer program product comprising a non-transitory computer readable medium and instructions that enable a computer having a display unit to perform operations, comprising:

displaying, for a plurality of parameters each having an upper limit value, a state value of each parameter for a predetermined period of time with respect to said upper limit value, on said display unit;

determining, for each of said parameters, whether said state value is close to said upper limit value or not;

displaying, on said display unit, a warning to a user with regard to the parameter of which said state value is determined by said procedure for determining to be close to said upper limit value; and displaying, for each of said parameters, a countermeasure for improving the state on said display unit when said state value is close to said upper limit value.

11. A display processing system comprising:

means for displaying, for a plurality of parameters each having an upper limit value, a state value of each parameter for a predetermined period of time with respect to said upper limit value;

means for determining, for each of said parameters, whether said state value is close to said upper limit value;

means for displaying a warning to a user with regard to the parameter of which said state value is determined to be close to said upper limit value; and means for displaying, for each of said parameters, a countermeasure for improving the state when said state value is close to said upper limit value.

* * * * *